United States Patent [19]

Miller

[11] Patent Number: 4,652,917
[45] Date of Patent: Mar. 24, 1987

[54] REMOTE ATTITUDE SENSOR USING SINGLE CAMERA AND SPIRAL PATTERNS

[75] Inventor: John W. Miller, Saint Paul, Minn.

[73] Assignee: Honeywell Inc., Minneapolis, Minn.

[21] Appl. No.: 639,610

[22] Filed: Aug. 10, 1984

Related U.S. Application Data

[63] Continuation of Ser. No. 315,839, Oct. 28, 1981, abandoned.

[51] Int. Cl.⁴ .............................................. H04N 7/18
[52] U.S. Cl. ...................................... 358/107; 356/3; 356/152
[58] Field of Search .................. 358/107, 108; 356/1, 356/3, 4, 27, 28, 21, 22, 152; 364/516, 562, 559

[56] References Cited

U.S. PATENT DOCUMENTS

| | | | |
|---|---|---|---|
| 3,462,604 | 8/1967 | Mason | 250/206 |
| 3,793,481 | 2/1974 | Ripley et al. | 358/107 |
| 3,850,511 | 11/1974 | Merchant | 351/7 |
| 3,856,410 | 12/1974 | Swift et al. | 358/107 |
| 3,869,694 | 3/1975 | Merchant et al. | 351/7 |
| 3,953,670 | 4/1976 | Prince | 358/125 |
| 4,109,060 | 4/1977 | Woodman | 356/152 |
| 4,034,401 | 7/1977 | Mann | 358/107 |
| 4,044,377 | 8/1977 | Bowerman | 358/107 |
| 4,136,568 | 1/1979 | Seymour | 73/655 |
| 4,168,123 | 9/1979 | Price | 356/152 |
| 4,238,228 | 12/1980 | Hay et al. | 364/559 |
| 4,355,895 | 10/1982 | Cairns et al. | 356/152 |
| 4,373,804 | 2/1983 | Pryor et al. | 356/1 |
| 4,373,808 | 2/1983 | Pell et al. | 356/152 |

Primary Examiner—John C. Martin
Assistant Examiner—Edward L. Coles
Attorney, Agent, or Firm—Robert A. Pajak

[57] ABSTRACT

A system for monitoring the attitude of an object with respect to a fixed based without any material connection to the object, comprising imaging apparatus mounted on the base so that a surface of the object is in the field of view, targets on the surface of such spaced sites, remote from the imaging apparatus that the apparatus images the targets in relative positions determined by the locations of the sites, and computing apparatus determining from changes in the relative positions of the images the causative changes in the attitude of the object with respect to the base.

7 Claims, 16 Drawing Figures

REMOTE ATTITUDE SENSOR USING SINGLE CAMERA AND SPIRAL PATTERNS

This application is a continuation of application Ser. No. 315,839, filed Oct. 28, 1981, now abandoned.

TECHNICAL FIELD

This invention relates to the field of optics, and particularly to apparatus and procedures for monitoring the attitude or position, with respect to a base, of a body capable of displacement with respect thereto. While it is generally useful in many applications, the invention will be described herein for illustrative purposes in a preferred embodiment in the aeronautical field.

BACKGROUND OF THE INVENTION

There are many circumstances under which it is desirable to be able to measure or monitor the attitude or position of a first body with respect to a second body. When material connections can be made between the two bodies, the changes in attitude or position are quite easily detected. It sometimes happens, however, that there is no convenient or practical way of providing material connections between the bodies, so that alternative means for detecting the changes of interest must be sought. Observation of the movement of an aircraft wing under various conditions of loading, wind gusting, and vehicle maneuvering is one example of such a situation, as will now be explained.

The intuitive concept of an aircraft as a rigid structure moving through the air is fallacious, especially in connection with more modern aeronautical designs. Very considerable motion is possible, for example, of the wing tips with respect to the fuselage: they are capable of pitch motion, when the wing twists about a generally transverse axis, of roll motion, when the wing bends upward or downward, and even of some yaw motion. The latter motion is more particularly significant for a wing store, that is, for an object mounted on the upper or lower wing surface such as a missile.

It is desirable to be able to monitor, or compensate for, the wing geometry changes which occur—in flight testing, in wind tunnel experiments, and in tactical situations involving discharge of wing-born missiles. By way of illustration certain problems related to military aircraft will be discussed below.

Survival of interceptor and ground attack aircraft is very difficult when the enemy possesses modern defensive weapons. A possible way to deal with the threat is to fly the aircraft on an unpredictable course using high-g maneuvers. Most recent analyses indicate that four seconds is about the maximum nonmaneuvering time that can be tolerated, and that maneuvers involving two to four g's should be used during or within 4 seconds of weapon firing. This implies that remote parts of the fire control system will be stressed out of alignment during critical phases of target acquisition and pointing.

Reconnaissance systems often involve an attitude tie-in to an attitude reference in the fuselage, and yet they may be mounted, so as to be quite movable with respect thereto, through flexibility of the wings.

Gusts and maneuvers frequently cause disturbances in the wings that reduce the margin of safety enough to limit maneuvers. Wing bend and twist often misalign a missile having a slewable tracking seeker. Such a missile usually has a narrow field of view, often only two or three degrees wide, while the wing bend and twist can be as much as nine degrees each, so that a target picked up on a fuselage-mounted radar or electrooptical system cannot be located within the field of view of the missile itself.

The problem also exists when seeker pods are mounted under the wing because they may be stressed out of alignment with the fuselage-mounted fire control elements and other wing mounted elements. They are also large and heavy, and thus tend to induce aerodynamic loads that cause both steady state and transient misalignments.

SUMMARY OF THE INVENTION

The present invention, in an aeronautical application, comprises apparatus and procedures for remotely monitoring the attitude of a surface, such as a wing or wing store, entirely without any material connection to the surface in question. Targets on the surface are observed by imaging means carried in the fuselage as a base, and a computer determines from the positions and movements of the target images the causative angular movements of the surface about pitch, roll, and yaw axes. The angles so determined may be of value for themselves, as in wind tunnel or flight testing of aircraft wing performance, or they may be useful as correction factors in navigational systems with wing mounted components, or in control systems for missiles stored on or under aircraft wings.

The invention may make use of imaging means located at two sites spaced sufficiently to offer a base for triangulation. Alternatively, the number and location of the targets may be so selected as to enable system operation using imaging means at a single site, the algorithms of a computer fed from the imaging means being appropriately chosen.

While a preferred embodiment of the invention described herein is particularly well adapted for aircraft use, the invention is of general utility wherever it is desired to monitor remotely a changing attitude or position. A partial listing of applications for the invention includes aircraft wing and stores alignment measurement, measurement of wing deflections for load alleviation and damping, platform alignment and measurement, turret and gun alignment measurement, vehicle alignment and measurement, spacecraft structure alignment measurement, assembly parts alignment measurement, parts features and tool alignment measurement, terrain and outside surrounding and object measurement and location for both aircraft and land vehicles, aircraft control surface measurement, measurement of other aircraft attitudes, and simplified occulometers or eye direction measuring devices.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views.

DESCRIPTION OF THE PREFERRED EMBODIMENTS

Figure 1:
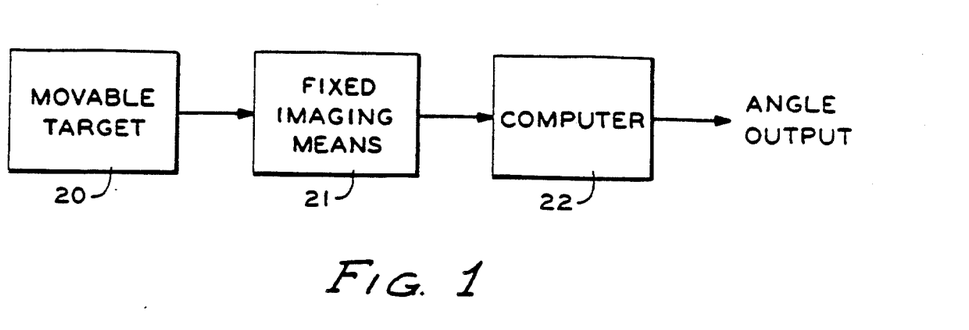
FIG. 1 is a block diagram of the invention in general terms.

In overview, see FIG. 1, the invention comprises a target 20, such as a plurality of shaped spots, marked on an object whose position is to be monitored, in the field of view of fixed imaging means 21 which supplies suitable inputs to a computer 22, which in turn gives as its output one or more angles identifying the motion of the object. In appropriate circumstances, the imaging means rather than the target, may be movable.

Figure 2:
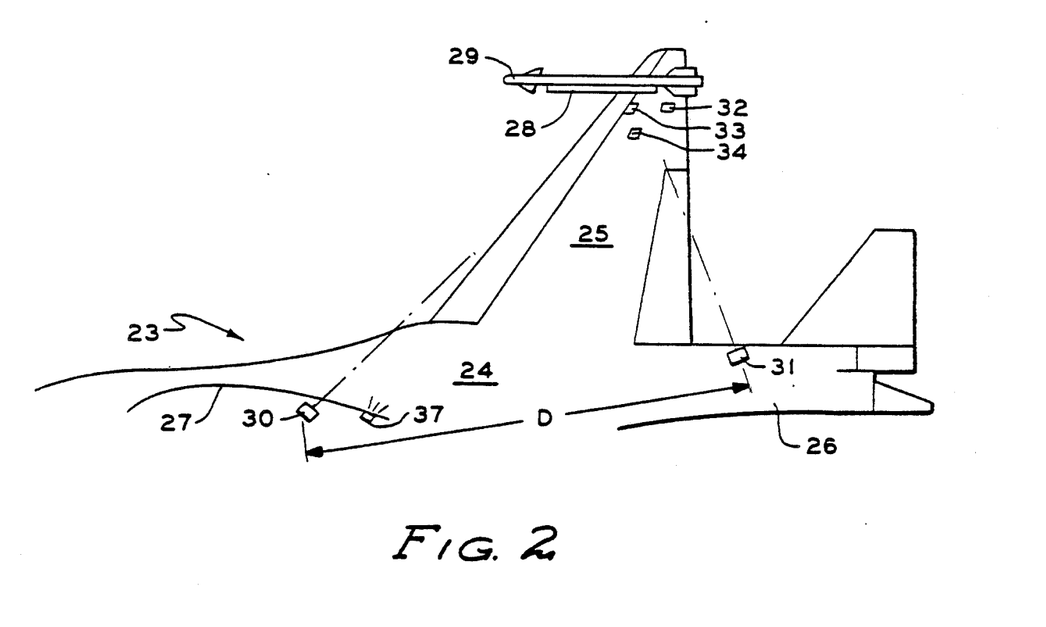
FIG. 2 is a fragmentary view in perspective of the invention applied to a specific aeronautical problem.

FIG. 2 shows the invention somewhat schematically in an aircraft application. An aircraft 23 has a fuselage 24, a wing 25, an empennage 26, and a cockpit 27. A launcher assembler 28 is mounted on wing 25 in any suitable fashion to carry and discharge a missile 29. These are standard and well known elements.

According to the invention, imaging apparatus is carried in the fuselage or cockpit as a fixed base, and comprises an imaging device or electronic camera 30 mounted with a field of view directed along wing 25. A second camera 31 may be located in the fuselage at a site spaced from camera 30 sufficiently that the distance D between them constitutes an adequate base line for triangulation.

A characteristic of the invention is the use of a target arrangement. One desirable target comprises a plurality of shaped spots 32, 33, 34, positioned on wing 25, in the field of view of the imaging means. These spots may be painted on the wing, in precisely known spatial relationship, and may comprise rectilinear outlines which contrast optically with and are lighter than the adjacent wing surface. Similar targets spots may also be provided on missile 29. If the apparatus is to be used at night, means for illuminating the targets is provided, such as an infra-red lamp 37.

To simplify later computation, target spots 32-34 are positioned on wing 25 so that their medians lie on axes of an orthogonal coordinate system, the median of spot 33 defining the origin of the system, and the medians of spots 32 and 34 being spaced from that of spot 33 by a known distance S, typically—24 inches. The coordinate system is the customary one in which X is positive forwardly, Y is positive to the right, looking forward, and Z is positive downwardly. For practical purposes these spots may be considered coplanar in the X-Y plane. The spots are shown as rectangular, and their sides are not precisely aligned with the coordinate axes.

The computations used in practicing the invention are based on the coordinate system just defined, not on the location of the imaging means. The line from the origin of the coordinate system to imaging means 30 for example has an azimuth angle component $\alpha$, projected on the X-Y plane, and an elevation angle component $\beta$ in a plane normal to the X-Y plane. In one embodiment of the invention these angles were 20° and 45° respectively.

If a second camera 31 is used, the computational basis remains as before, the second camera simply having its own values for $\alpha_2$ and $\beta_2$ in the same coordinate system.

Since the computations are based on an origin at target 33, any relative motion between the wing surface and the camera is interpreted for mathematical purposes as movement of the camera. When the invention is used in other applications, the principle may still prevail that the coordinate system for computation is defined by the targets being observed, rather than by the location of the imaging means.

Camera 30 functions to image on a detector array the targets in its field of view. The apparent shapes and positions of the images on the array vary with movement of the wing surface and the missile relative to the fixed base, and the image changes are used to measure changes in attitude of the wing surface or wing store.

Figure 3:
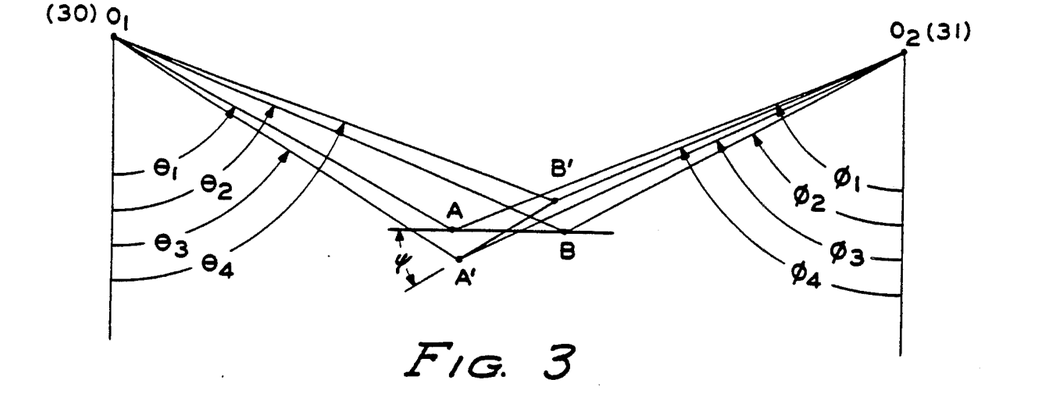
FIGS. 3-5 are sketches illustrative of geometrical bases underlying the invention.

Thus in FIG. 3 if camera 30 is at point $O_1$, the ends of a line segment AB define angles $\theta_1$, $\theta_2$, with respect to a zero of direction, and from camera 31 located at point $O_2$ the line segment defines angles $\phi_1$ and $\phi_2$. If the line rotates to a new position A'B' through an angle $\psi$, its ends define new angles $\theta_3$, $\theta_4$ at camera 30 and new angles $\phi_3$ and $\phi_4$ at camera 31.

Figure 4:
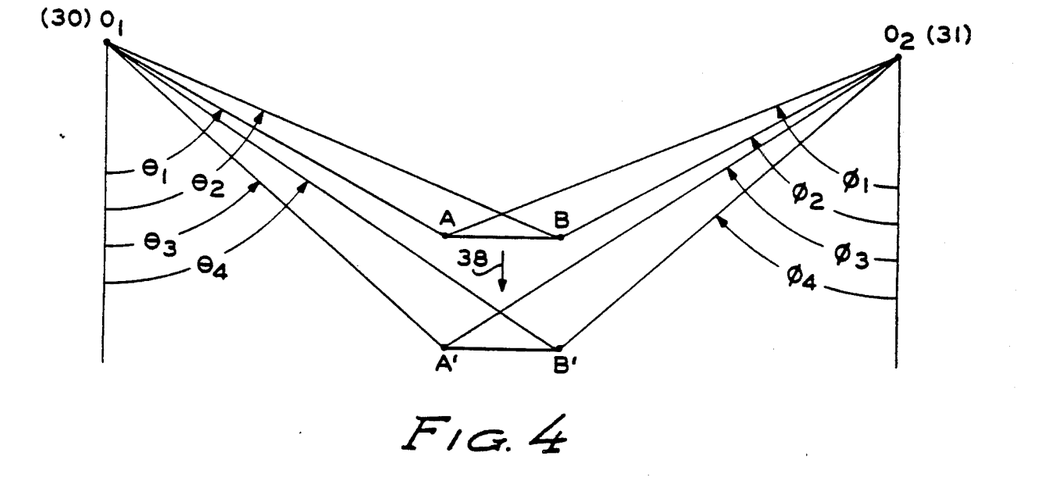
Figure 5:
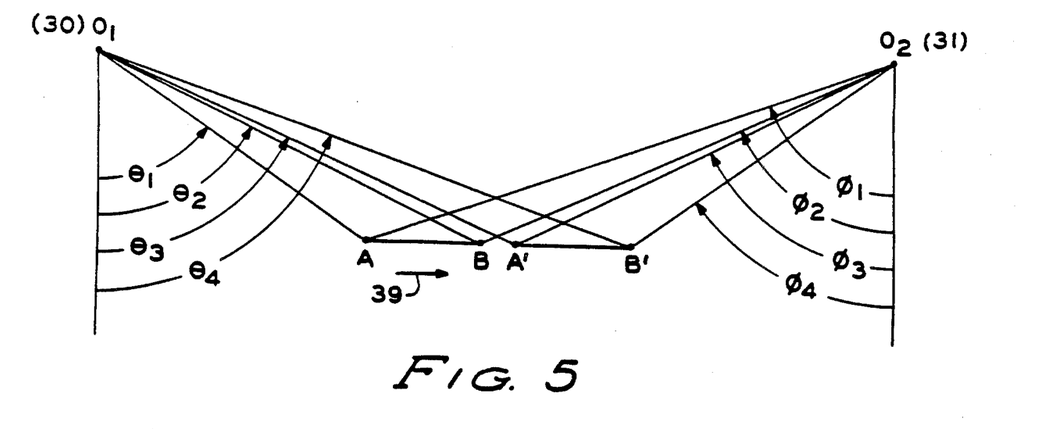

In FIG. 4, if a line segment AB defining angles $\theta_1$, $\theta_2$, $\phi_1$, $\phi_2$ moves in the direction of the arrow 38 to a new position A'B', it defines new angles $\theta_3$, $\theta_4$, $\phi_3$, $\phi_4$. In FIG. 5 if a line segment AB defining angles $\theta_1$, $\theta_2$, $\phi_1$, $\phi_2$, moves in the direction of the arrow 39 to a new position A'B' it defines new angles $\theta_3$, $\theta_4$, $\phi_3$, $\phi_4$. In practice, point A above is the location of the median of one of the target spots, and point B is the location of the median of a second spot.

While the above examples relate to movement of line segment AB in a single plane, any movement of the line segment can be defined by angle components resolved into appropriate mutually orthogonal planes. It will be evident that it is possible to monitor the position and direction of the line segment AB by observing the values of $\theta$ and $\phi$ and applying the appropriate algorithm: If the distances from A to B and to $O_1$ are known, a different algorithm makes possible the monitoring of the position and direction of line segment AB with a single camera 30.

Figures 7, 8:
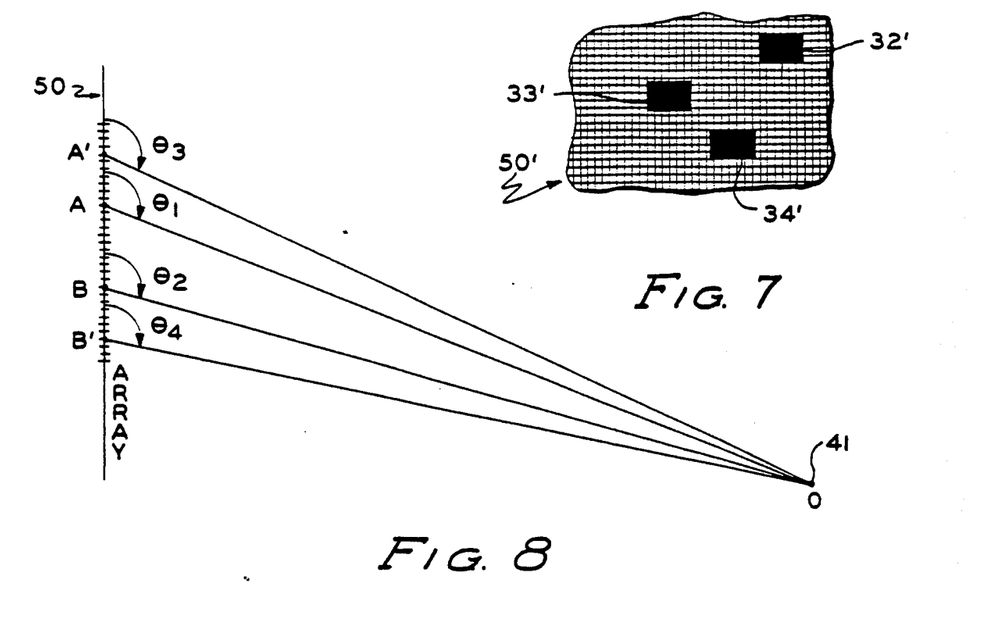
FIG. 7 is a sketch illustrating the imaging resulting from the targeting in FIG. 1.
FIG. 8 is a sketch to a larger scale showing imaging associated with the geometry of FIG. 2.

FIG. 8 shows that the line segments are projected beyond the lens 41 of the camera as similarly identified lines on a sensor array 50.

Figure 6:
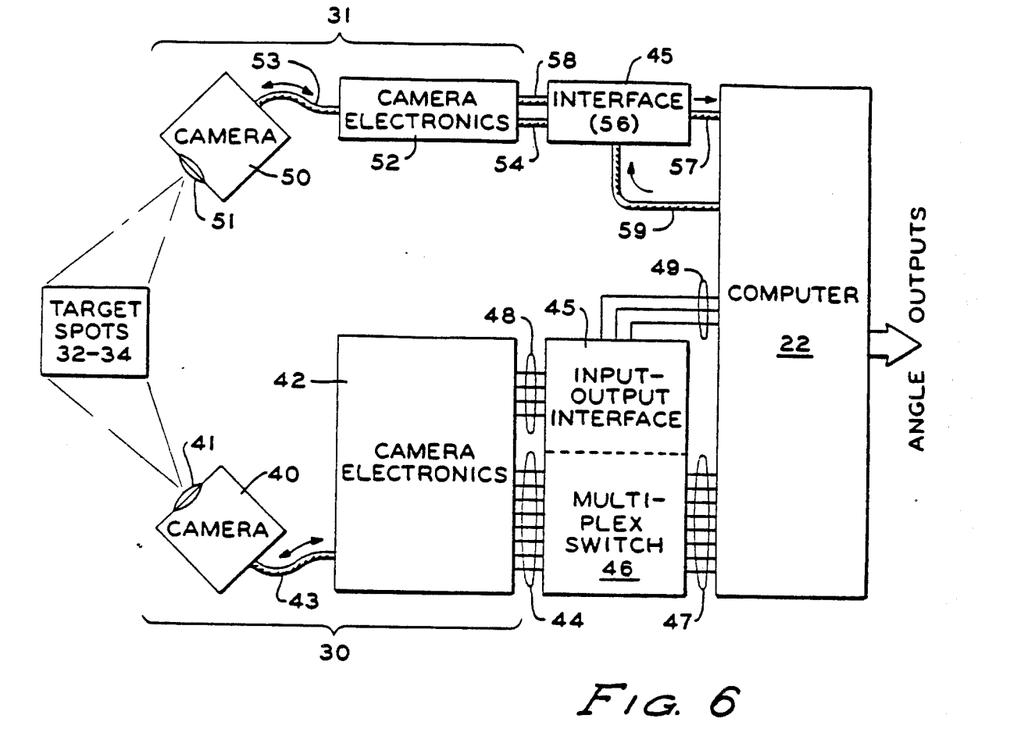
FIG. 6 is a block diagram of imaging apparatus according to the invention.

Attention is now directed to FIG. 6, which outlines in block diagram form a system according to the invention for monitoring spots 32, 33, and 34 using two cameras 30 and 31 supplying signals to computer 22. Light falls on targets 32-34 and is reflected through the lens of imaging device 30, which in one embodiment of the invention comprises a solid state General Electric TN 2500, consisting of a small remote head 40 with a 25 mm lens 41 having manual iris and focus adjustments, and a self contained camera electronics unit 42 with integral power supply, interconnected by a cable 43. The camera contains a 244×248 charge injection device imaging array sensor, each individual picture cell or "pixel" which subtends 2.8 miliradians at the lens. Unit 42 gives on a cable 44 a digital video output in 8 bit parallel format at a 4.5 MHz word rate.

The camera is operated in the interlaced 122 line format, whereby adjacent pairs of charge injection device image lines are read out simultaneously and the combined two-line format is displayed twice in each field. Total image data is available at 60 Hz in successive odd and even fields, the two fields containing the same information.

Unit 42 is connected to computer 22 through an input-output interface 45 including a multiplex switch 46 connected to unit 42 by cable 44 and to computer 22 by a cable 47. Further cables 48 and 49 connect interface 45 to unit 42 and computer 22 to cause properly timed transfer of digital data from camera 30 to computer 22, as will be discussed more fully in connection with FIG. 9.

It will be evident that for camera 31 elements 40 to 49 are replicated as elements 50 to 59, both inclusive.

Figure 10:
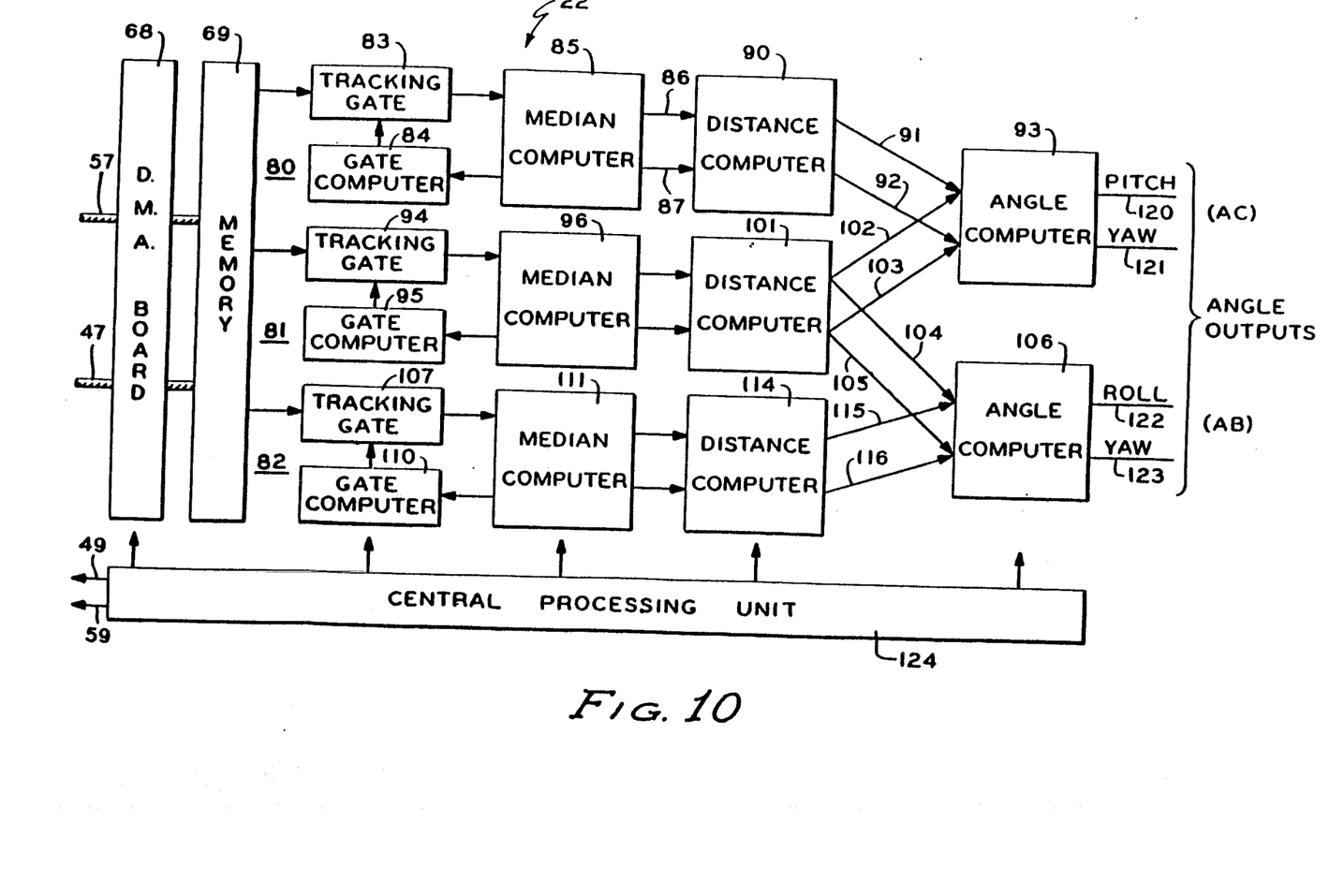
FIG. 10 is a block diagram of computing apparatus usable in the inventive embodiment of FIG. 1.

Interface 45 acts as a buffer between the camera and the input to computer 22, which in the embodiment of the invention referred to above comprised an INTEL MDS800 having as input a Direct Memory Access board 68 (FIG. 10). The interface transfers to the board every alternate pixel of a line, and every alternate line of a frame. This is necessary since board 68 cannot accept data at the 4.5 MHz data rate of the camera. Data is transferred to computer memory 69 only from the even fields, the odd fields data being unused, and alternate lines are omitted since lines are duplicated.

Figure 9:
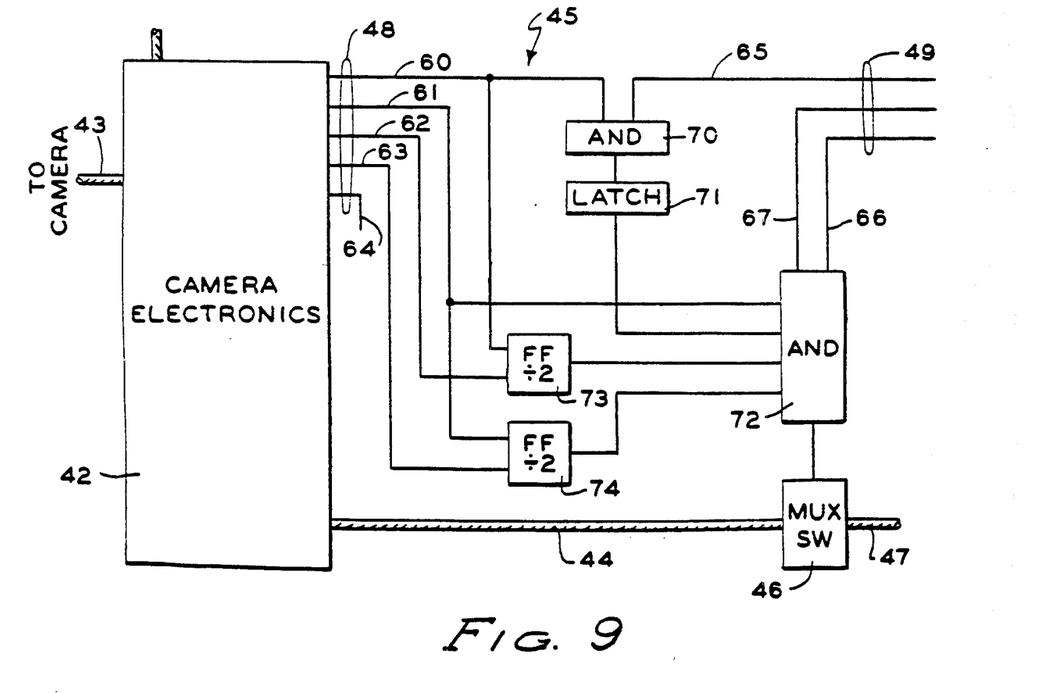
FIG. 9 is a diagram of a detector array and scanner usable in the invention.

FIG. 9 shows that the usual function signals supplied in cable 48 comprise an even field signal on conductor 60, a synchronized blanking signal on conductor 61, a horizontal synchronization signal on conductor 62, an element clock rate signal on conductor 63, and a vertical synchronism signal on conductor 64, and last signal not being used. Similarly, cable 49 is shown to comprise a conductor 65, carrying a tag register signal, and conductors 66 and 67 carrying transfer request and transfer acknowledge signals, as is customary for the MDS800. In addition to multiplexer switch 46, interface 45 includes a dual input AND 70 with a latch 71, a quadruple input AND 72, and a pair of flip-flops 73 and 74 each arranged to perform a division by 2. Only the five most significant bits on cable 44 are used, and allow for 32 shades of gray.

FIG. 10 shows the program steps that computer 22 follows to compute the desired angle outputs. The computer has two principal functions. It must determine from each set of binary numbers stored in a memory 69 the corresponding locations of the medians of spots 32' to 34', and then must compute from changes in these locations the causative angular changes between the wing surface and the fixed based or fuselage. FIG. 10 specifically relates to a target having three spots, 32, 33, and 34, and shows that when three target spots are used computer 22 is arranged to operate in three channels, 80, 81, and 82, one for each spot.

The channels are substantially identical, and channel 80 will now be described in detail. It includes a tracking gate generator 83, a gate computer 84, a median computer 85, and a distance computer 90. The coordinate system defined above is projected onto the camera array, and the target spots are chosen to be of such size and configuration as to cover an area on the array four pixels in size (See FIG. 7). The location of the median of each spot is determined by positioning a target gate six pixels by eight pixels in size over the image so that the median of the image is at the median of the gate.

Board 68 accepts from camera electronics 42 a set of binary numbers representative of the present outputs of the pixels within the tracking gate, and transfers the numbers to memory 69. Changes in the pixel outputs are not thereafter accepted until all computations on the set in memory are completed.

The vertical median of the spot is determined by summing the outputs of the pixels in the upper half of the gate, summing the outputs of the pixels in the lower half of the gate, subtracting the second sum from the first sum, and dividing the difference by twice the sum of the outputs of the pixels in the brightest horizontal row—which is taken to be the row, nearest the vertical center of gate, of that half of the pixels which resulted in the larger of the two initial sums.

The result of this computation is the number of pixels by which the median of the target spot deviates from the median of the tracking gate. The gate is now repositioned vertically, by one or more pixels, and the calculation is repeated, until the deviation is minimized; that deviation is then the fraction of a pixel by which the gate median differs from the spot median, if accuracy to this degree is needed.

A similar computation is made to determine the location of the horizontal median of the target spot in pixels and fractions thereof. These medians are supplied on conductors 86 and 87, as the coordinates, in pixels, of the median of the target spot on a second coordinate system, in the plane of the array, of which the origin is arbitrarily taken at the upper left hand corner of the array. The coordinates are mixed numbers, a decimal portion being determined by the deviation between the target and gate medians, and an integral portion being defined by the location of the tracking gate.

In computer 90 the medians are scaled to represent angles, as determined by the known distance from the lens to the array, and are multiplied by the known range from the camera to the target in order to obtain the corresponding linear displacements of the median of target 32 in the physical unit of the coordinate system of the targets, which displacements are supplied at conductors 91 and 92 to an angle computer 93.

In channel 81, comprising gate generator 94, gate computer 95, median computer 96, and distance computer 101, the same procedures are followed, to provide on conductors 102 and 103, and on conductors 104 and 105, the displacements of the median of target 33 in the physical units of the target coordinate system. In channel 82, comprising gate generator 107, gate computer 110, median computer 111, and distance computer 114, the same procedures are followed to provide on conductors 115 and 116 the displacements of the median of target 34 in the physical units of the target coordinate system.

In computer 93 the linear displacements on conductors 91, 92, 102 and 103 for targets 32 and 33 are divided by the known spacing between the targets, in order to obtain the sines of the angles between the coordinate frame and the straight line joining the target spot medians, in pitch at conductor 120 and in yaw at conductor 121. In computer 106 the linear displacements on conductors 104, 105, 115 and 116 from targets 33 and 34 are divided by the known spacing between the targets in order to obtain the sines of the angles between the coordinate frame and the straight line joining the target spot medians, in roll at conductor 122 and again at yaw at conductor 123. The yaw angle can be taken at either conductor 121 or conductor 123. The pitch, roll, and yaw outputs are all arc sines, and may be used for monitoring the target movements or for performing control functions in accordance with the target movements, as desired by the designer.

After the computation is completed, board 68 accepts from camera electronics 42, and transmits to memory 69, a replacement set of binary numbers representative of the updated outputs of the pixels and the gates, and the computation is repeated.

Operation of computer 22 is under the general supervision of a central processing unit 124. Attached as an appendix is a program listing which can be used with computer 22.

For other configurations of targets, modifications of the median and gate computations may be more optimal.

Thus far the target under detailed consideration has been a set of spots defining the origin and the pair of axes of a plane Cartesian coordinate system. The concept of computation based on observation of relative motion between a target and an imaging means is not so limited, however.

Figure 11:
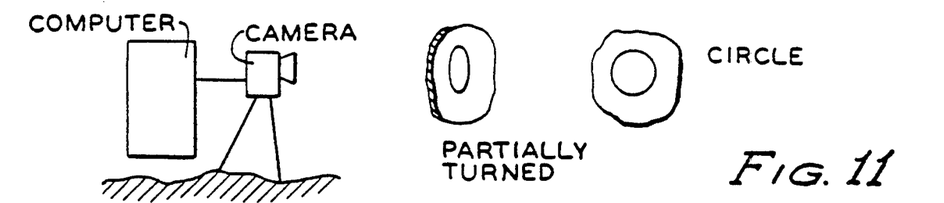
FIGS. 11-15 are sketches showing alternative procedures usable in aeronautical and other applications of the invention.

FIG. 11 shows that the target may be a circle, which of course varies in ellipticity with the viewing angle.

Figure 12:
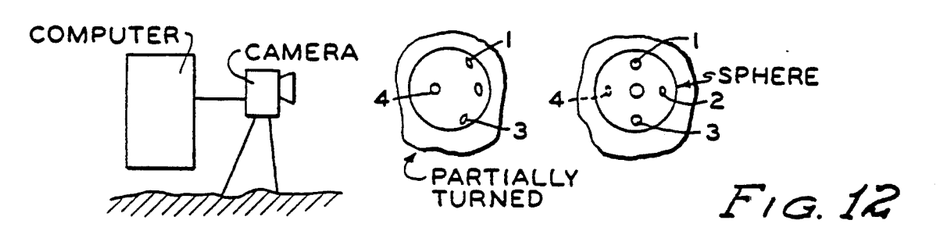

FIG. 12 shows that the circle may in fact be a portion of a spherical or paraboloidal mirror, and may be combined with two or more spots, the spots being either on the mirror or on an adjacent structure: One or more of the spots may be retroreflective if desired.

Figure 13:
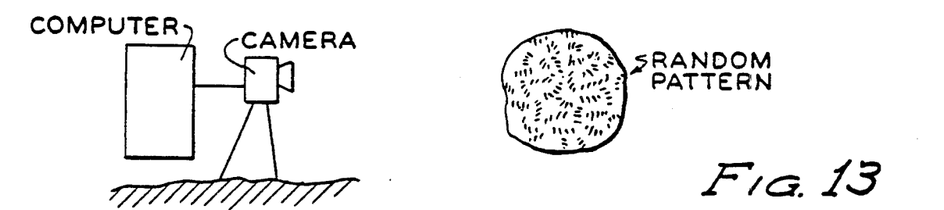

FIG. 13 shows that the target may be any set of high contrast markings or lines comprising a pattern capable of recognition.

Figure 14:
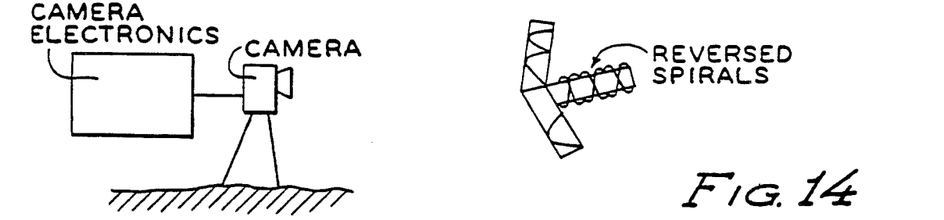

FIG. 14 shows that the target may be a plurality of cylinders bearing helical markings.

Figure 15:
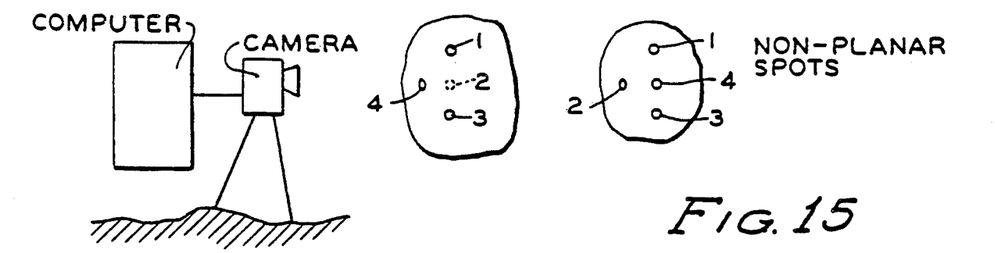

FIG. 15 shows that the target may comprise a plurality of spots, one of which is not in the plane of the others.

It will be appreciated that when different targets are chosen, appropriate modifications must be made in the algorithms used by the computer: In the embodiment of FIG. 13 appropriate pattern recognition components may also be desirable.

Figure 16:
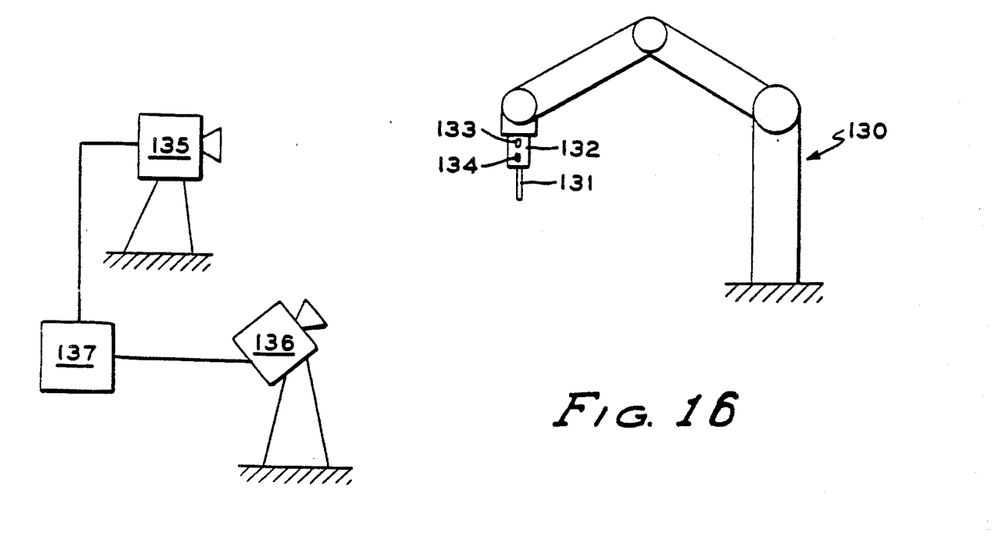
FIG. 16 shows the invention employed in a different application.

By way of further illustration, FIG. 16 shows the invention employed in a different application. Here a shop machine 130 has a tool 131 carried in a holder 132 having targets thereon, two of which are shown at 133 and 134. A pair of imaging means 135 and 136 have the targets in their fields of view, and give outputs to a computer 137 which determines angular movements, as described previously, defining the operation of the tool.

From the foregoing, it will be evident that the invention comprises methods and apparatus for monitoring the attitude of an object with respect to a fixed base without any material connection to the object, including imaging means mounted on the base so that a surface of the object is in the field of view thereof, target means on said surface and remote from the imaging means, having a characteristic such that the image thereof changes with change in the orientation of the surface, and means determining from changes in the image the causative changes in the attitude of the object with respect to the base.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. An apparatus for monitoring the alignment of an aircraft wing relative to a substantially rigid fuselage of said aircraft comprising:

at least first, second, and third target spots fixed in relation to said wing and defining a target plane, said target spots having median points thereof which form verticies of a triangle, said median point of said first spot defining an orgin of a co-ordinate system on said target plane;

imaging means rigidly mounted on said fuselage with a field of view including said target spots, said imaging means including an imaging lens and a two dimmensional image plane for obtaining first, second, and third spot images thereon corresponding to said target spots projected on said image plane through said imaging lens;

first means coupled to said imaging means for determining coordinates of median points of said image spots on said image plane; and second means, responsive to signals representative of (i) said coordinates of said median points of said image spots, (ii) distances between said median points of each of said target spots, (iii) the distance between said lens and said image plane, and (iv) the distance between said lens and each of said target spots, for determining the orientation of said target plane relative to said image plane thereby providing an indication of the orientation of said wing relative to said fuselage.

2. The apparatus of claim 1 wherein said triangle is a right triangle.

3. The apparatus of claim 1 wherein:

said image plane includes a two-dimensional array of light sensitive sensors each having a known coordinate, wherein said array is defined by a fixed number of horizontal rows and vertical columns of said sensors, and wherein each of said sensors has an outout indicative of the light impinging thereon; and said first means includes, means for defining a tracking gate having first and second horiziontal and vertical halves, said tracking gate defining an area of an integral number of said sensors and sufficiently larger than said image spots, said tracking gate having a mid-point coordinate related to the position of said tracking gate in relation to said image plane, means for separately summing each of said sensor outputs within each of said first and second halves of said tracking gate, means for determining the difference between said sensor output sums of said first and second horizontal halves and the difference between said sensor output sums of said first and second vertical halves, means for repositioning said tracking gate in response to said differences so as to optimally center said image spot within said tracking gate, means for determining the greatest sum of said sensor outputs in a row and the greatest sum of said sensor outputs in a column within said tracking gate and about the geometrical middle defining said halves, and computational means responsive to (i) the position of said tracking gate mid-point coordinate, and (ii) said greatest sums of said row and column for determining coordinates of the median point of said image spots on said image plane.

4. An apparatus for determining the coordinates of a median point of a target image on an image plane defined by a two-dimensional array of light sensitive sensors each having a known coordinate, wherein said two-dimensional array is defined by a fixed number of horizontal rows and vertical columns of said sensors, and wherein each of said sensors has an output indicative of the light impinging thereon, the apparatus comprising:

means for defining a tracking gate having first and second horizontal and vertical halves, said tracking gate defining an area of an integral number of said sensors and sufficiently larger than said target image, said tracking gate having a mid-point coordinate related to the position of said tracking gate in relation to said image plane;

means for separately summing each of said sensor outputs within each of said first and second halves of said tracking gate;

means for determining the difference between said sensor output sums of said first and second horizontal halves and the difference between said sensor output sums of said first and second vertical halves;

means for repositioning said tracking gate in response to said differences so as to optimally center said target image within said tracking gate;

means for determining the greater sum of said sensor outputs in a row and the greatest sum of said sensor outputs in a column within said tracking gate and about the geometrical middle defining said halves; and computational means responsive to (i) the position of said tracking gate mid-point coordinate, and (ii) said greatest sums of said row and column for determining coordinates of the median point of said target image on said image plane.

5. The apparatus of claim 4 further comprising:

means for determining a ratio of the difference between said horizontal halves and said greatest horizontal row sum;

means for determining a ratio of the difference between said vertical halves and said greatest vertical column sum; and said computational means including means responsive to said ratios for determining said target image median point.

6. The apparatus of claim 4 wherein said image plane is a charge couple device.

7. An apparatus for monitoring the orientation of a first object relative to a second object comprising:

at least first, second, and third target spots fixed in relation to said first object and defining a target plane, said target spots having median points thereof which form verticies of a triangle, said median point of said first spot defining an orgin of a coordinate system on said target plane;

imaging means rigidly mounted on said second object with a field of view including said target spots, said imaging means including an imaging lens and a two dimmensional image plane for obtaing first, second, and third spot images thereon corresponding to said target spots projected on said image plane through said imaging lens, said image plane including a two-dimensional array of light sensitive sensors each having a known coordinate, wherein said array is defined by a fixed number of horizontal rows and vertical columns of said sensors, and wherein each of said sensors has an outout indicative of the light impinging thereon;

first means coupled to said imaging means for determining coordinates of median points of said image spots on said image plane, said first means including, means for defining a tracking gate having first and second horizontal and vertical halves, said tracking gate defining an area of an integral number of said sensors and sufficiently larger than said image spots, said tracking gate having a midpoint coordinate related to the position of said tracking gate in relation to said image plane, means for separately summing each of said sensor outputs within each of said first and second halves of said tracking gate, means for determining the difference between said sensor output sums of said first and second horizontal halves and the difference between said sensor output sums of said first and second vertical halves, means for repositioning said tracking gate in response to said differences so as to optimally center said image spot within said tracking gate, means for determining the greatest sum of said sensor outputs in a row and the greatest sum of said sensor outputs in a column within said tracking gate and about the geometrical middle defining said halves, and computational means responsive to (i) the position of said tracking gate mid-point coordinate, and (ii) said greatest sums of said row and column for determining coordinates of the median point of said image spots on said image plane; and second means responsive to changes in said median point coordinates of said image spots for determining causitive changes in the spatial relation between said first and second objects, said second means being responsive to signals representative of (i) said coordinates of said median points of said image spots, (ii) distances between said median points of each of said target spots, (iii) the distance between said lens and said image plane, and (iv) the distance between said lens and each of said target spots, for determimng the orientation of said target plane relative to said image plane thereby providing an indication of the orientation of said first object relative to said second object.

* * * * *